United States Patent [19]
Benesi

[11] Patent Number: 5,462,677
[45] Date of Patent: * Oct. 31, 1995

[54] FILTER APPARATUS BELT FILTER MEDIUM CONTROL AND TREATMENT

[76] Inventor: Steve C. Benesi, 611 McClay Rd., Novato, Calif. 94947

[*] Notice: The portion of the term of this patent subsequent to Mar. 8, 2011, has been disclaimed.

[21] Appl. No.: 167,559

[22] Filed: Dec. 13, 1993

Related U.S. Application Data

[63] Continuation-in-part of Ser. No. 864,524, Apr. 7, 1992, Pat. No. 5,292,434.

[51] Int. Cl.⁶ ........................ B01D 25/12; B01D 37/00; B01D 24/46
[52] U.S. Cl. ................... 210/791; 210/770; 210/227; 210/231; 210/90; 210/387; 210/388; 210/393; 210/400; 100/198
[58] Field of Search .................... 210/770, 231, 210/227, 387, 791, 90, 391, 393, 400, 388, 636; 100/198

[56] References Cited

U.S. PATENT DOCUMENTS

| | | | |
|---|---|---|---|
| 3,437,210 | 4/1969 | O'Neill | 210/387 |
| 3,443,695 | 5/1969 | O'Neill | 210/251 |
| 3,457,169 | 7/1969 | Schneider | 210/23 |
| 3,464,555 | 9/1969 | Schneider | 210/85 |
| 3,478,874 | 11/1969 | McLean et al. | 210/23 |
| 3,497,063 | 2/1970 | Hirs | 210/75 |
| 3,499,532 | 3/1970 | Schneider | 210/138 |
| 3,608,734 | 9/1971 | Schneider | 210/387 |
| 3,850,812 | 11/1974 | Schneider | 210/231 |
| 3,899,426 | 8/1975 | Hirs | 210/387 |
| 3,933,792 | 1/1976 | Schneider | 210/231 |
| 4,065,390 | 12/1977 | Schneider | 210/225 |
| 4,233,157 | 11/1980 | Miller | 210/137 |
| 4,267,060 | 5/1981 | Miller | 210/741 |
| 4,289,615 | 9/1981 | Schneider | 210/91 |
| 4,568,460 | 2/1986 | Bratten | 210/387 |
| 4,664,813 | 5/1987 | Schneider | 210/771 |
| 4,944,870 | 7/1990 | Yagashita et al. | 210/103 |
| 5,059,318 | 10/1991 | Benesi | 210/227 |
| 5,133,884 | 7/1992 | Carlsson | 210/791 |

FOREIGN PATENT DOCUMENTS

| | | |
|---|---|---|
| 1471712 | 3/1966 | France . |
| 2252119 | 6/1975 | France . |
| 4139324 | 9/1992 | Germany . |
| 2020565 | 11/1979 | United Kingdom . |

*Primary Examiner*—Ana M. Fortuna
*Attorney, Agent, or Firm*—George W. Wasson

[57] ABSTRACT

A filter belt movement control and belt treatment means for a pressure filter apparatus. The movement control includes a marking means in or on the filter belt medium and a sensing means on the filter apparatus. The sensing means detecting the position of the marking means in or on the belt filter medium and adapted to signal a controller for control of the position of the belt filter medium within the apparatus. The treatment means including cleaning, bathing and coating means for treating the belt filter medium and vibratory means for operation with the treating means.

20 Claims, 4 Drawing Sheets

FILTER APPARATUS BELT FILTER MEDIUM CONTROL AND TREATMENT

This application is a CONTINUATION IN PART Of U.S. application Ser. No. 864,524, filed Apr. 7, 1992 for FILTER APPARATUS AND METHOD USING FILTER BELT MEDIUM, now U.S. Pat. No. 5,292,434, issued Mar. 8, 1994.

This invention relates to a filter apparatus employing a belt filter medium and to an apparatus and a method for positioning and treating the belt filter medium.

BACKGROUND OF THE INVENTION

In many industrial processes and in fluid production systems, a slurry of solids suspended in a liquid is produced and it becomes necessary to separate the solids from the liquids so that each material may be treated in ways that will make disposal or use of the treated materials both economical and environmentally effective. In most such processes or systems, the slurry material is fed to a filter apparatus which may take many forms including a belt press, a vacuum filter or a pressure filter. In one form of pressure filtration system a pair of plate members form an internal space chamber separated by a filter media of some form. The plate members are pressed together at mating surfaces with the filter media positioned between the mating surfaces and spread across the interior space separating one plate from the other plate. Slurry materials are fed into one plate and into the chamber while filtrate liquids are taken away from the other plate leaving behind the solids of the slurry accumulated on the filter media. After a sufficient amount of slurry has been treated to accumulate solid materials, the plates are separated and the filter media is replaced and the filtration process is repeated with a clean filter media. The filtrate fluid and solids are then separately used, treated or disposed of in an acceptable manner.

The prior art apparatus of the nature of the above described apparatus have used pressurized gas or vacuum filtration to extract the fluids from the slurry materials. Vacuum-atmosphere pressure differentials have not been effective in creating "dry" solids in the filter cakes they produce. Other technologies used in filter apparatus have employed elastomeric diaphragms within the chamber with the diaphragm hydraulically (or pneumatically) actuated to create pressure differentials to squeeze out liquids from solids. Such systems may use compressed air (sometimes called "air-fluff" or "blow down") following the hydraulic diaphragm squeeze to drive out interstitial liquid. Such systems are not as cost effective as pressurized gas filtration because those systems usually require both the air pressure step as well as the diaphragm squeeze to produce dry solids. Further, elastomer diaphragms limit the chamber size and hence limit the solids cake size that can be produced and thus the filter effectiveness. In addition, heat and chemicals may adversely effect elastomer diaphragms. Also, the diaphragm and air squeeze systems add time to the filtration cycles resulting in lower efficiency and lower production rates.

In prior U.S. Pat. No. 5,059,318, issued Oct. 22, 1991 and U.S. Pat. No. 5,292,434, issued Mar. 8, 1994 to the present inventor, there is disclosed a system and apparatus for producing an effective seal between mating filter plates in a manner to substantially reduce or completely eliminate leakage of slurry fluids between the mating filter plates and for operating a pressure filter apparatus employing a belt filter medium. The present invention relates to such a filter apparatus and discloses the apparatus and methods for controlling the positioning of the belt filter medium and for treating the belt filter medium to accomplish maximum effectiveness of the medium within the filter apparatus.

SUMMARY OF THE INVENTION

In accord with the present invention, a filter apparatus is formed with a pair of plate members with recessed portions which mate with each other to create a filter chamber between the plate members and a belt filter medium is positioned between the mating plate members. The peripheral sidewalls of the plate members are adapted with internal grooves for effectively sealing the mating faces of the plates. The filter chamber is adapted to receive the slurry to be filtered and one of the plates is adapted to contain the slurry and to receive controlled fluids or gasses under pressure to force the liquids from the slurry. The other of the plates is adapted with suitable means to support the filter medium and to receive the liquids extracted from the slurry while the solids are retained within the chamber. The plates are moved relative to each other to mate the sidewalls and seal the chamber during the filtering process and, after the filtering has been completed, the plates are separated to permit the solids from the slurry to be removed from the filter chamber. The movement of the solids is accomplished by moving the filter medium from between the separated plate members both for the purpose of removal and for introducing a clean filter medium between the plates. The plates are then ready to be pressed against each other again for a repeat of the slurry filtering process.

The present invention provides for the use of a continuous filter medium belt that can be placed between the plate members, pressed between the plate member sidewalls and retained within the filter chamber, and when the filtering process has been completed the belt can be advanced to remove the filtered solids and to move a clean filter medium between the plates. The filter apparatus provides a means for advancing the filter medium to a cleaning position outside of the chamber and for sensing the positioning of the filter medium to a proper alignment within the chamber in position for the next filtering operation. This results in more area of filter medium being used, less medium travel, and shorter cycle times. Alternatively, the filter medium may be disposable with the filter cake and a new portion of filter medium is advanced into the apparatus with each batch operation.

In accord with the present invention, positioning and treatment of the belt filter medium is performed outside the chamber of the filter apparatus to optimize the effectiveness of the belt filter medium within the chamber of the filter apparatus during the filter operation and the performance of the filter apparatus in the removal of liquids and the production of a substantially dry filter cake.

As described in my prior patents the filtering process performed by the filter apparatus can be further enhanced by the application of solvent extraction materials to the slurry materials to remove additional liquids or materials with the liquids or to extracting desired or undersired materials from the filter solids. The filter apparatus includes control means adapted for opening and closing the filter plates at timing intervals and for the introduction of liquid and gasses at controlled times.

In the present invention there are provided apparatus and methods for positioning and treating the belt filter medium to condition the belt for repeated use and for positioning the belt in desired positions.

It is an object of the present invention to provide a filter apparatus that can be efficiently prepared to handle a batch of slurry materials to produce a substantially dry filter cake in a minimum of time and may be recycled to place the filter apparatus in condition to handle another batch of slurry materials in a minimum of time.

A further object in accord with the preceding objects is to provide a filter apparatus with a filter medium belt material and construction that will permit the belt to be automatically positioned between mating plates of the apparatus in controllable steps to maximize the use of the filter medium, shorten cycle times, reduce belt travel times, and increase ease of belt tracking.

A further object in accord with the preceding objects is to provide a filter apparatus with belt filter medium treatment means for treating of the belt filter medium with fluids or gasses, with or without chemical additives and with or without vibratory mechanisms to prepare the belt filter medium for maximized effectiveness in separating solids from liquids in said slurry materials entering said filter apparatus.

These and further objects and features of the present invention will be readily apparent to those skilled in the art from the appended drawings and specification illustrating a preferred embodiment wherein:

DESCRIPTION OF THE PREFERRED EMBODIMENT

Figure 1:
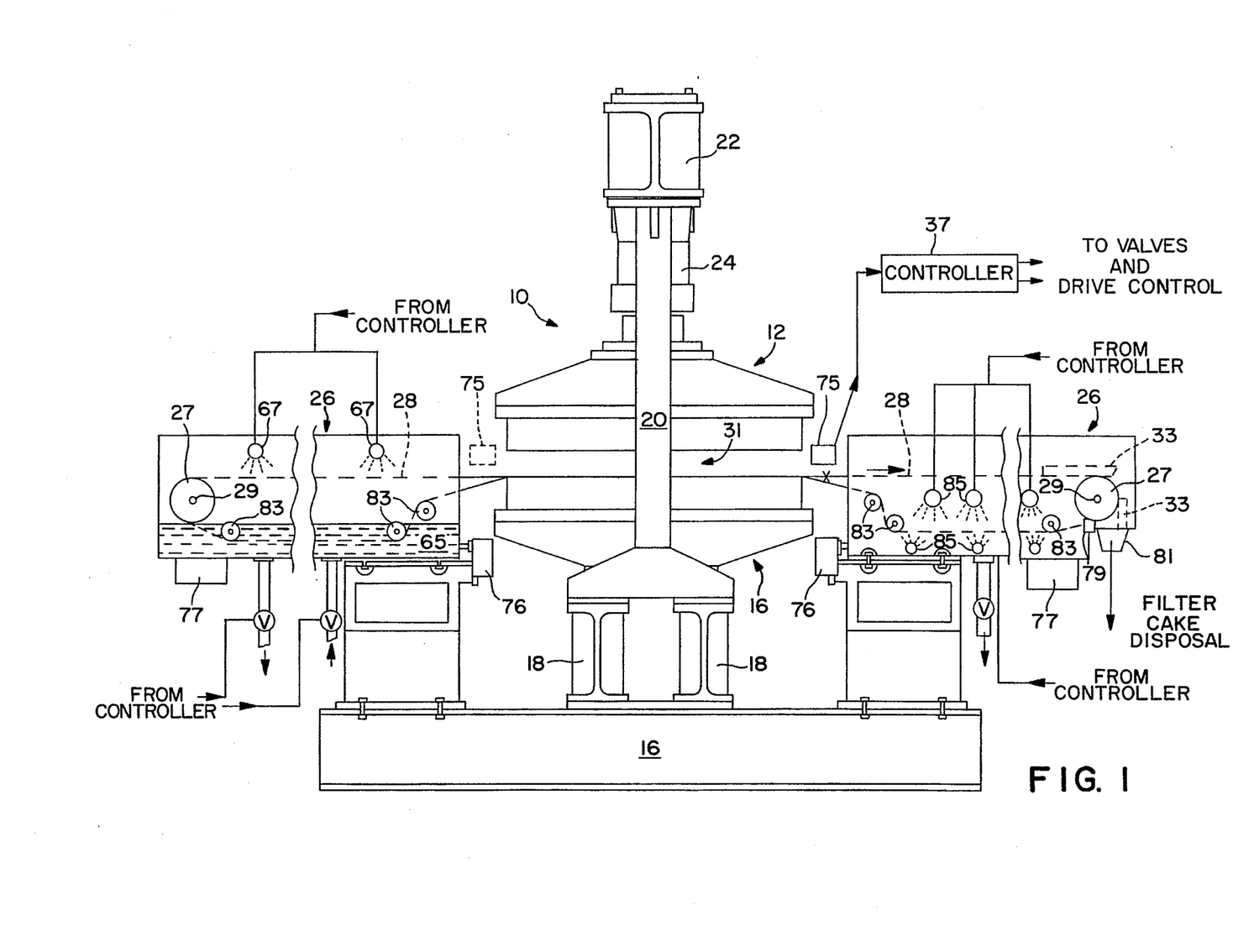
FIG. 1 is an elevational view showing the apparatus of the present invention as assembled with the filter chamber in OPEN position.

As illustrated in the assembly drawing of FIG. 1, the filter apparatus 10 of the present invention comprises a pair of plate members, an upper plate member 12 and a lower plate member 14, supported on and relatively movable within a support frame assembly comprising a pair of base beams 16, a pair of lower strongback members 18, a pair of spaced tension columns 20, and an upper strongback member 22. The support frame assembly is an assembly of the lower strongback members 18 on the base beams 16 with the spaced tension columns 20 mounted on the lower strongback member 18 and the upper strongback member 22 mounted on the tension columns. The frame assembly has an open interior portion for the support of the lower plate member 14 on the lower strongback 18, with suitable spacing and bracing. The upper plate member 12 is suspended from the upper strongback 22. A hydraulic jack mechanism 24 is provided between the upper plate member 12 and the upper strongback 22. As shown in FIG. 1 for a continuous belt operation, at each side of the assembly and mounted on the base beams 16, a pair of filter belt drive, treatment and washing assemblies 26 including rollers 27 are mounted for movement and treatment of a filter belt 28; the feed or drive function and the treatment and washing function can be performed at either side of the assembly as will be explained later in this specification. It should also be understood that in the alternative form of the apparatus using a disposable medium, there will be a different feed apparatus; however, the medium will be placed in the same location within the chamber and advanced with each operation of the apparatus.

Figure 4:
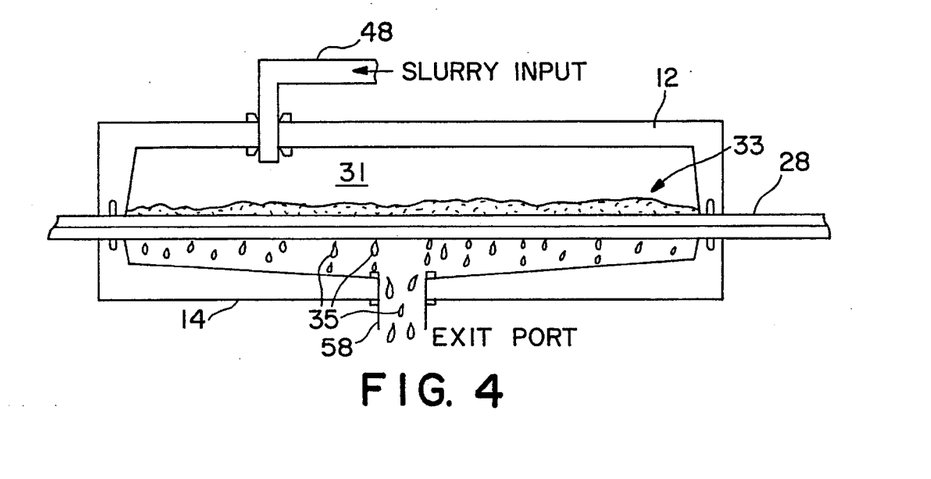
FIG. 4 is a partial sectional view showing the filter apparatus chamber with a double layer of filter belt medium.

The assembled filter apparatus of the present invention is adapted to open and close the plate members placing the upper plate member 12 in contact with lower plate member 14. When the plate members are closed, the filter belt medium 28 is between the upper plate 12 and the lower plate 14. The hydraulic jack mechanism 24 has been operated to force the plates together at a force at least exceeding the force created by the pressuized fluid with the belt filter medium in between the plates to seal the filter chamber 31 that is created between the closed plates as shown in FIG. 4.

It should be understood that a great deal of care is taken in the fabrication of each of the structural elements to assure that the assembly will be level, plumb, true and parallel as the plates are closed. In that regard it is important that the lower face of the upper strongback 22, the upper and lower mating faces of the upper plate member 12, the upper and lower mating faces of the lower plate member 14 and the mating faces of the lower strongback 18 be horizontal and parallel. The tension columns 20 and the centerline of the upper plate 12 and lower plate 14 should be vertical and parallel to each other and perpendicular to the the horizontal members. With care in the leveling and truing of these elements the plate members will engage each other and produce a good seal as they are closed, as well as align operating forces to their most effective use with a minimum of operating stress.

The details of construction of the upper and lower plate members is shown and described in my U.S. Pat. No. 5,292,434 and reference should be made to that patent for details. Because those details are not essential to the understanding of the present invention, they will not be repeated here.

Figure 2:
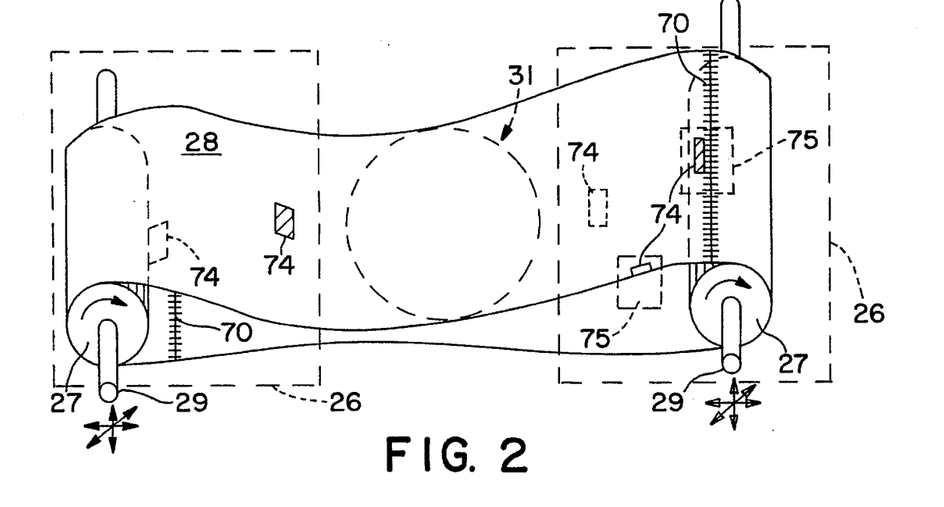
FIG. 2 is a perspective view of a filter medium belt as used in the present invention.
Figure 3:
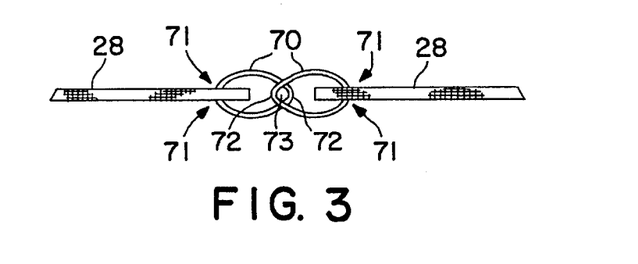
FIG. 3 is is a partial sectional view showing a filter belt splice.

FIG. 2 illustrates conceptually the form of a continuous belt filter medium 28 that may be used with the apparatus of the present invention. With the continuous belt a double layer of filter medium is created within the filter chamber. It should be understood that the belt need not be continuous and need not be reuseable; that is, the belt may be an elongated rolled or folded belt that will be passed between the plates when they are opened and closed between the plates when the plates are closed and the belt may be discarded with the filter cake. In the endless belt form 28 as shown in FIG. 2, the belt is formed to be joined at a splice area as shown in FIG. 3 where each end of the belt is finished with meshed hooks 70 that hook onto the belt at 71 and have a loop end at 72 that is adapted to align with the loop end of the meshed hooks of the other end of the belt. A joining pin or bar 73 fits within the loop ends 72 to form the continuous belt. Sections of belting may be joined at laped areas at their ends with glue or sewing joining the laped areas.

The continuous belt form 28, in accord with the present invention, is provided with a form of position marker on or attached to the belt to function with a sensing or detecting device cooperating with the member to provide for control of the belt movement and position. It is important to position the belt with respect to the chamber 31 both in the direction of travel and transverse to the direction of travel. The operation of the filter press for which the filter belt medium is adapted requires that the plate members be wholly covered by the belt and that the mating faces of the plates mate with the belt filter medium between the faces. For that purpose the rollers 27 at each side of the apparatus are adapted to move the belt in the direction of its intended travel and transversely with respect to the plate members 12 and 14.

In one form of the continuous belt 28 an elastomer embedded detectable marker 74 is provided. The detectable marker in the elastomer is of a form that can be sensed by a device such as a proximity switch and the detecting of the marker can be used to control the movement of the belt filter. As illustrated in FIG. 1 a proximity detector 75 is mounted adjacent to the belt drive assembly 26 in a place to permit the belt to be advanced to introduce a clean filter medium between the plate members. With a proximity detector in the belt travel path, the belt can be centered within the filter chamber with proper control of the belt drive mechanisms. Alternative forms of locating and positioning means for the belt medium may include tabs on the belt and whisker switches for detecting the tabs as shown in FIGS. 6–9.

FIG. 1 also illustrates adjustment means for lateral positioning of the assemblies 26 at both the feed and wash portions. At each assembly a station adjustment device 76 is fixed to the support frame for the feed or wash assembly 26 with adjustable means for moving the assembly toward or away from the filter apparatus for proper tensioning of the filter belt and for transverse movement to properly align the belt with the filter chamber 31.

The apparatus of the present invention may be controlled from a central control panel, not shown, either manually or by operation of a suitable programmable computer that can be programmed for sequence, times and pressure of operations. The purpose of controlling the operation of the apparatus is to insure that the filter belt medium is properly placed between the mating faces that form the filter chamber and to insure that the filter belt medium is in optimum condition to accomplish the most effective separation of solids from liquids in the slurry materials fed to the apparatus. FIGS. 2–9 illustrate several of the concepts included in the present invention for detecting the position and for controlling the alignment of the filter belt medium with respect to the chamber or other parts of the assembled filter apparatus.

FIG. 2 illustrates a form of a continuous belt filter medium that is contemplated for use with the filter apparatus herein described. The belt 28 is shown as positioned around a pair of rollers 27 that are supported on rotatable and movable shafts 29. Shafts 29 are movable by the station adjuatment devices 76 in any of three respectively perpendicular directions, by means not herein shown, so as to be rotatable in the direction of the arrows shown on the rollers in FIG. 2 and to be movable in the direction of belt travel through the filter apparatus 10, transverse and perpendicular to the direction of belt travel in the direction of the arrows shown adjacent to the rollers so as to be establish proper and desired alignment of the belt within the chamber 31 shown in FIG. 2 in phantom lines. As described in my prior patents, it is important to effecting a complete seal of the filter chamber 31 to have the filter belt medium 28 accurately aligned with the upper and lower plates of the apparatus that are then pressed against each other with the filter belt medium between the mating faces of the plates. That alignment of the belt 28 and the belt drive rollers 27 with respect to the filter chamber 31 of the apparatus 10 is accomplished by moving the drive shafts 29 for the rollers in the directions of the arrows shown adjacent to the shafts 29 in FIG. 2.

FIG. 3 illustrates the joint that forms sections of belt filter medium into a continuous belt. In FIG. 2 there are two such joint elements to indicate that the belt may be made of segments of belt media joined to form one continuous belt. The purpose of such a belt will be described hereinafter.

FIG. 4 illustrates the position of a belt filter medium 28 between the faces of an upper plate member 12 and a lower plate member 14 pressed together to form the chamber 31. In an illustrative form FIG. 4 illustrates a slurry entry port 48, a formed filter cake 33 of solid materials from the input slurry and a filtrate of liquid materials 35 that have passed through the belt filter medium 28 for passage out of the chamber through the exit port 58.

The alignment and positioning of the belt filter medium is accomplished by detecting the position of the belt as it is moved outside of the chamber 31 of the apparatus with the use of sensing means 75 that are adapted to cooperate with marking means 74. FIGS. 5–9 illustrate different forms that the marking means 74 and sensing means 75 may take. FIG. 1 illustrates the sensing means 75 at the exit end of the open filter apparatus 10; however, it should be understood that the sensing means may be at the entry end of the apparatus or at other places along the travel path of the belt filter medium.

Figure 5:
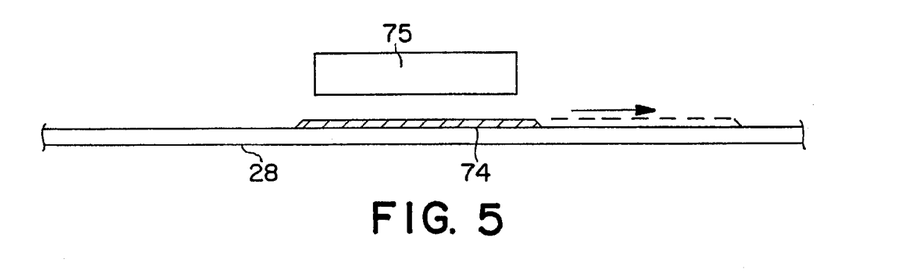
FIG. 5 is a side elevational view of a belt filter medium with a marking means on the belt and showing the position of a sensing means.

One form that the marking means may take is shown in FIG. 5 where the marking means 74 is imbedded in, or supported on, the filter belt medium 28 and the sensing means 75 is shown in a position to detect proximity to the marking means. In this form of marking means, the detectable material may be iron filings, aluminum foil, wire, woven metal cloth, metal shim stock or plumbing tape and those materials may be embedded in an elastomer that is adhered to the filter belt, woven into the belt fabric or attached by any suitable means. The sensing means 75 may be in the form of a detector that is coupled inductively or by capacitance to the marker, or by any suitable means such as a radio active detector or an optical system that can sense the proximity of the belt marker. The material used for the marking means may be selected based on the slurry material being filtered. For example, some potential marking materials may be chemically incompatable with the slurry and therefore would not be used. Also, the form of sensing means may be determined by the conposition of the slurry materials, for example, an inductive sensor might not be functional when the slurry contains inductively detectable materials. The position of the marker with respect to the sensor is transfered to a controller as shown in FIG. 1 and the controller supplies signals to the rotary drive means for the belt to move or stop the belt in the proper position. The controller also supplies signals to station adjustment devices 76 having conventional means, not here shown, for moving the belt drive means in the direction of belt travel or transverse to that direction to position the belt in the proper alignment with the filter chamber 31.

Figure 6:
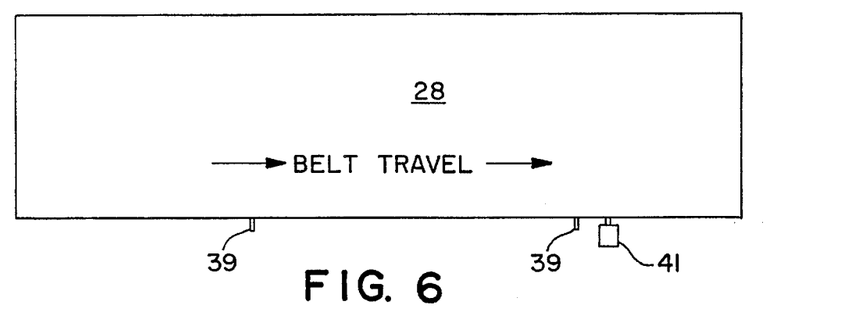
FIG. 6 is top plan view of a belt filter medium illustrating one form of belt position detecting apparatus.
Figure 7:
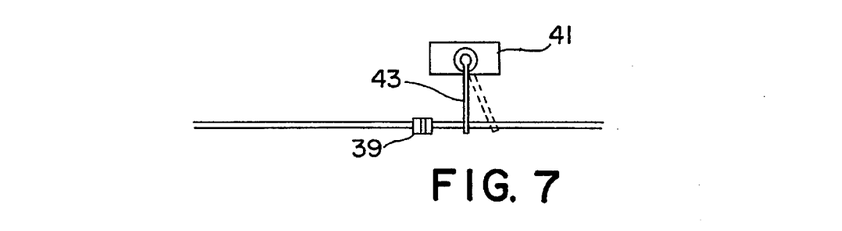
FIG. 7 is a side elevational view of the detecting apparatus of FIG. 6.

Another form of marking means is illustrated in FIGS. 6 and 7 where a marker 39 is attached to the side of the filter belt and a mechanical switch 41 with an operating arm 43 is aligned with the travel of the side marker 39. The mechanical switch 41 is adapted to send a signal to the controller 37 to control the movement and position of the filter belt 28 and may include means for signaling the controller 37 to cause the controller to energize the belt positioning means for the forward and transverse positioning of the belt.

Figure 8:
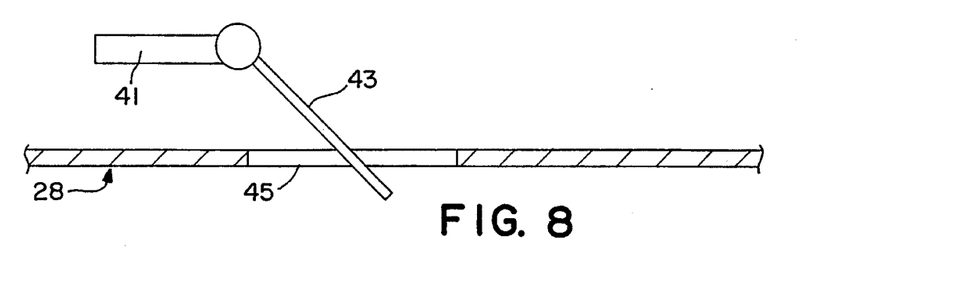
FIG. 8 is a side elevational view of another form of belt position detecting apparatus.

FIG. 8 illustrates a belt marker and sensor means that constitutes a hole or detent 45 in the filter belt 28 and a mechanical means that cooperates with the hole or detent to sense the position of the belt. The sensing means may take the same form as the mechanical switch 41 and operating arm 43 as shown in FIG. 7.

Figure 9:
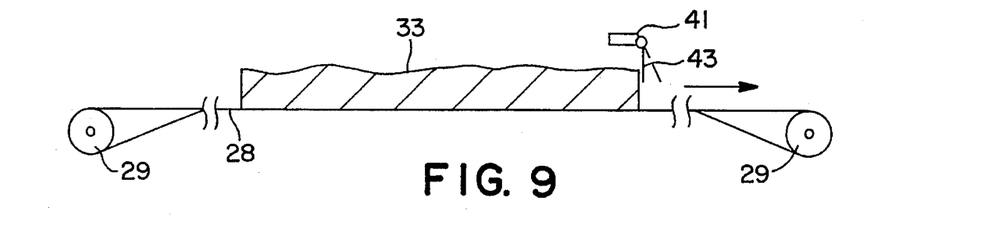
FIG. 9 is a side elevational view of a belt positioning apparatus operated by detecting the position of a filter cake.

Another form of control and sensing for the belt travel is shown in FIG. 9 where a mechanical switch is positioned to be contacted by a filter cake 33 as it is moved with the belt as the belt is withdrawn from the filter chamber. The mechanical switch may also take the form of the switch 41 and operating arm 43 as described with respect to FIGS. 7 and 8.

Figure 10:
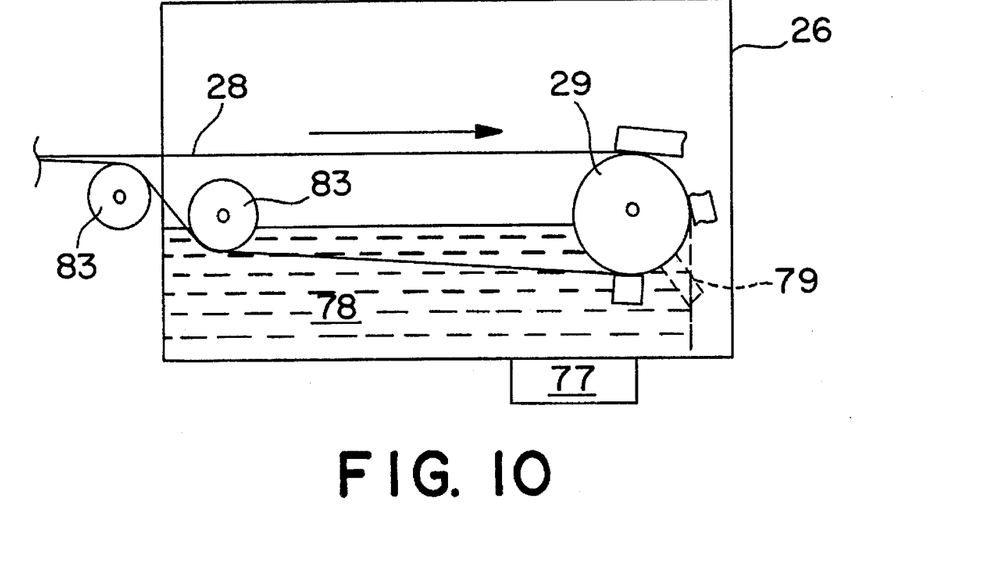
FIG. 10 is a sectional view of an alternative form of an apparatus for washing a belt filter medium.
Figure 11:
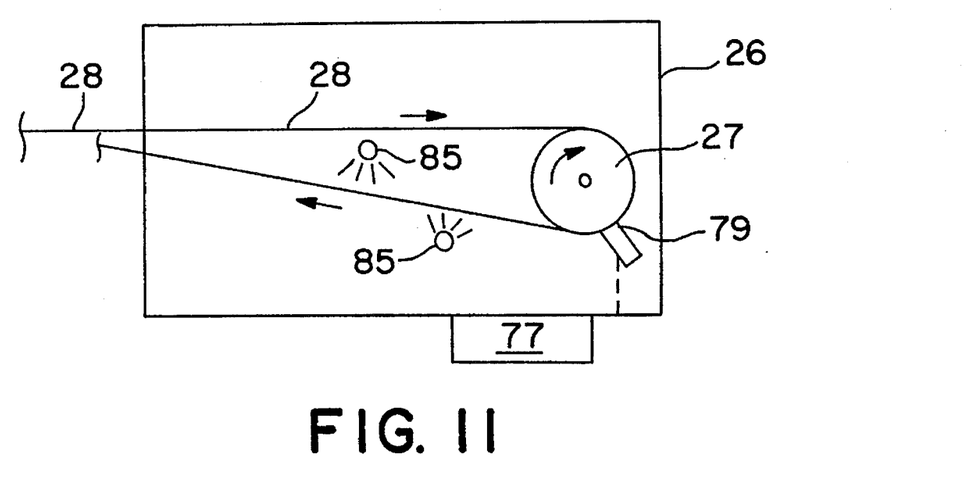
FIG. 11 is a sectional view of another alternative form of an apparatus for washing and/or treating a filter belt medium.

The filter belt treatment elements of the present invention are illustrated in FIGS. 1, 10 and 11. As shown in FIG. 1, there is a belt cleaning and treating assembly 26 at both ends of the filter apparatus 10 and, as has been described, these assemblies and their functions can be performed at either end of the apparatus depending on the direction of travel of the filter belt. For the purpose of this description, the assembly 26 at the right side of FIG. 1 will be described as a belt wash station, the assembly 26 at the left side of FIG. 1 will be described as a belt treatment station, though both stations could treat the belt, and the filter belt direction of travel will be from left to right. It should be evident that the continuous belt filter medium 28 is positioned within the filter chamber 31 with two layers of the belt in the chamber; an upper belt that is intended to accumulate the solids of the slurry material during the filter operation and a lower belt that should be preferably only contacted by and backwashed by filtrate from the slurry material. In the usual continuous filter belt, the belt travels from the filter chamber to the cleaning assembly, back into the chamber as the lower of the pair of belts for a repeated filter operation, then into the belt treatment station and eventually back into the filter chamber as the upper layer of the two layer belt filter medium. The distance of the belt travel between each of the foregoing steps of operation is controlled by the controller 37 in response to sensing of spaced markers on the belt as has been described.

As shown in FIG. 1, when the filter chamber 31 is OPEN a filter cake 33 produced in the filter chamber 31 by the previous operation of the filter apparatus is transported with the filter belt 28 to a position for disposal through dump port 81 or free-fall to a disposal site. The filter belt medium passes around the belt drive roller 27 and is guided by suitable idler rollers 83 to pass by a single or a plurality of wash heads 85 above or below the belt. A scraper 79 contacting the belt may be employed adjacent to the roller 27 to scrape retained solid materials from the belt as well as at the exit from the wash assembly before entry into the chamber. The wash heads 85 are connected to a source of wash fluid under controlled pressure for washing any residue of the solids from the slurry materials from the fabric of the belt. The wash fluid exits through a suitable exit port for filtering and recycling. The operation of the wash heads 85 is controlled by the controller 37 in a manner to accomplish the desired washing of the filter belt while the belt is stationary or moving in its travel from and to the filter chamber 31. The wash fluid may contain surfactant materials and other chemical compositions for cleaning the belt. For example, preferred wash fluids may include HCl to remove scale such as $CaCO_3$ or NaOH for silica precipitation on the belt at the cake discharge end. After treatment with the foregoing chemicals and after the discharge of the filter cake and scraping by the scraper 79, the wash heads 85 may apply surfactants such as hydrophylic or hydrophobic materials depending on the slurry material being filtered to encourage dewatering. The belt washing assembly 26 is provided with a vibrator 77 that can be adapted to provide vibrations from low frequency repetitive shaking to ultrasonic, supersonic or high frequency vibrations for the purpose of removing the filter cake from the belt and removing any residual particles from the belt during the washing operation.

FIG. 1 also illustrates the belt treatment assembly 26 at the left side of the apparatus. This assembly provides idler rollers 83 for guiding the belt 28 through the assembly and includes means for supplying a bath of chemicals to the belt or spraying liquids or fluid solids onto the belt in preparation for its entry into the filter chamber 31 for a filter operation. The bath area may include a liquid that may be used to coat the belt with materials that will prevent some part or composition of the slurry material from adhering to the belt or to make the belt selectively attractive to some composition of the slurry material. The treatment assembly 26 may also be provided with spray heads 67 that can apply desired chemicals or solids to the belt. The materials applied to the filter belt in the treatment assembly 26 may be selected to make the belt hydrophilic (capable of combining with or taking up water) or hydrophobic (not capable of combining with or taking up water) so that the belt be prepared to perform selectable and desirable functions during the filter operation. Hydrophilic materials include silicates, polysulfones and similar materials. Hydrophobic materials include polypropylene, oleophilic and similar materials. The belt may also be treated with selected chemicals that will readily combine or refuse to combine with materials that are in the slurry materials to include or exclude some of those slurry materials. The surfactants or detergents may be cationic or anionic depending on the charge of the filter belt material. Such materials may include copper concentrates such as copper sulfide or copper oxide in water or oil based slurries such as kerosene with additives for metal rolling slurry filtration operations. The treatment assembly 26 may also be provided with a vibratory device 77 to provide for vibrations from low frequencies through ultrasonic and higher frequency ranges as the belt is treated or bathed. The operation and sequencing of the belt treatments is controllable by the controller 37 including entry and drain of the bath materials.

FIG. 2 illustrates a continuous filter belt medium 28 that has two coupling joints for coupling end-to-end belt segments. This form of belt may include belt segments of the same form or belt segments of different forms. In the different segment form a first belt portion that is adapted to withstand the abrasive or deleterious materials in the slurry materials; that first portion being adapted to accumulate the solid materials from the slurry, and a second protion of the belt may be provided as a spacing material, or a more permeable portion, for the advance of the first portion from the filter chamber through the cleaning assembly 26 and through the treatment assembly for repositioning within the chamber 31 for the next filtering operation. In this alternative form of two segment belt, the second belt portion is never placed in direct contact with the slurry material except for the filtrate from that slurry that passes through the first portion of the belt and then washes through the second portion. It should be evident that the marking means 74 on the belt 28 of this two segment belt assembly and the sensing means 75 on the filter apparatus must be properly programmed to advance the belt through the cleaning and treatment assemblies and to stop the advance of the belt when the first portion of the belt is again positioned within the chamber area.

FIG. 10 is a sectional veiw illustrating a variation in the form of the belt cleaning assembly 26 with a single cleaning head 85 above and a single head 85 below the filter belt 28. Also illustrated is one form of a scraper blade 79.

FIG. 11 is a sectional view illustrating another variation in the belt cleaning assembly 26 with a liquid wash bath 78 within the chamber 26. The liquid within the bath may be selected to both clean and to treat the belt with surfactants or chemicals for accomplishing a desired function for the belt within the chamber.

Both FIGS. 10 and 11 would include filter cake discharge paths and could include a vibrating means 77 to assist with the cleaning or treating of the belt filter medium 28.

From the preceding description of the elements of the filter apparatus of the present invention the operation of the apparatus should be readily apparent. The filter apparatus 10 is intended to be a substantially automatically operated filter apparatus functioning in a batch mode to separate solid materials from liquid materials in a fluid slurry fed into the apparatus. The apparatus accomplishes the filter operation by placing a filter belt medium 28 within the chamber 31 formed when upper and lower plate members, 12 and 14, are pressed against each other with the belt filter medium 31 between the mating faces of the plates. The apparatus includes means for opening and closing the filter chamber at controllable times, for maintaining the chamber closed and under pressure during the filtering operation and for opening the chamber when a filtering operation is completed. When the chamber 31 is opened the belt filter medium 28 can be advanced to remove a produced filter cake 33 from the chamber and for advancing a new filter belt portion into the area of the apparatus that will again form the chamber 31. The belt filter medium is driven in its travel through the filter apparatus by suitable drive means that are controlled by marking means 74 in, on or associated with the belt so that the cleaned and treated portions of the belt are positioned within the chamber and the belt is aligned properly with the faces of the chamber forming plates. The apparatus includes means 75 for sensing the location of the marking means 74, and control means 37 for automatically advancing and positioning the belt. Belt treatment assemblies 26 are provided for cleaning the belt after each filtering operation and for treating the belt with selected baths or chemicals to prepare the belt for repeated filtering operations. Vibratory means 77 are provided in the belt cleaning and treatment assemblies 26 to assist in the cleaning and treatment. The alignment, cleaning and treatment of the belt filter medium increases the effectiveness of the belt in its filter operation and extends the life of the belt by removing those materials that might be abrasive or chemically deleterious to the belt.

While certain preferred embodiments of the present invention have been specifically disclosed, it should be understood that the invention is not limited thereto as many variations will be readily apparent to those skilled in the art and the invention is to be given it broadest possible interpertation within the terms of the following claims.

I claim:

1. A filter apparatus having a belt filter medium for pressure filtering fluid slurry materials containing liquid and solid materials in a filter chamber and for creating a substantially dry filter cake of said solid materials on said belt filter medium, said apparatus having mechanical means for opening and closing said filter chamber and for controlling said filter apparatus including means maintaining said chamber closed and under pressure during filtering operations and for opening said chamber after filtering has been completed, belt drive means for positioning said belt filter medium within said filter chamber when said chamber is opened and pressure sealed within said chamber when said chamber is closed, said belt drive means including sensing means positioned with respect to said filter chamber for sensing the position of said belt filter medium with respect to said upper and lower plate members and for controlling operation of said belt drive means, and means for treating said belt filter medium before and after belt movement into and out of said filter chamber, said filter apparatus and said treating means including:

a continuous belt filter medium, means for treating said belt filter medium comprising means outside of said filter chamber and aligned with said filter chamber, said continuous belt filter medium including a plurality of detectable marking means along the length of said belt, said plurality of marking means being separated by a distance larger than said largest lateral dimension of said filter chamber, and said marking means being adapted to cooperate with said sensing means of said belt drive means and said means for treating said belt filter medium for
i) controlling operation of said belt drive means to position said belt filter medium within said filter chamber and within said means for treating said belt filter medium,
ii) and controlling operation of said means for treating said belt filter medium to prepare said belt filter medium for performing repeated pressure filtering operations.

2. The filter apparatus of claim 1 wherein said detectable marking means includes means selected from the group of aluminun foil, wire, woven metal cloth, metal shim stock and plumbing tape attached to said belt filter medium, and said sensing means is a means for detecting said detectable marking means and for controlling operation of said means for controlling said filter apparatus.

3. The filter apparatus of claim 1 wherein said detectable marking means includes means adapted to cooperate with said sensing means to determine the positioning of said belt filter medium within said filter chamber, said sensing means being adapted to control said belt position means to position said filter belt medium in the direction of belt travel and in the direction transverse to said direction of travel within said chamber.

4. The filter apparatus of claim 1 wherein said detectable marking means comprises mechanical marking means on said belt filter medium and said sensing means includes mechanical means adapted to cooperate with said marking means to control movement of said filter belt medium within said filter apparatus.

5. The filter apparatus of claim 4 wherein said marking means includes means attached to the perimeter of said belt filter medium and said sensing means includes means on said filter apparatus adapted to cooperate with said means attached to said belt.

6. The filter apparatus of claim 4 wherein said marking means includes a cut-out portion along said belt filter medium and said sensing means includes means on said filter apparatus adapted to cooperate with said cut-out portion along said belt.

7. The filter apparatus of claim 1 wherein said means for treating said belt filter medium outside of said filter chamber includes means for backwashing said belt filter medium.

8. The filter apparatus of claim 1 wherein said sensing means includes means for sensing the presence of a solid filter cake on said belt filter medium when said belt filter medium is moved from said filter chamber, and said sensing means includes means for controlling movement of said filter belt medium and said solid filter cake with respect to said filter chamber within said filter apparatus.

9. The filter apparatus of claim 1 wherein said belt filter medium includes end-to-end joined segments of different belt filter media, one of said belt filter media being adapted to pass liquids from said slurry materials while retaining solids from said slurry materials, another of said belt filter media being adapted to pass liquid materials from said slurry materials, and detectable means in both segments for aligning said belt filter medium within said chamber and for aligning said different belt filter media with respect to each other with said one of said belt media in contact with said slurry materials and said another of said belt filter media in contact with said one belt filter media and adapted to pass liquid materials passing through said one belt filter media.

10. The filter apparatus of claim 9 wherein said belt filter medium within said filter chamber includes a double layer of said belt filter medium, said double layer of belt filter medium including a first portion of one constructon and a second portion of a different construction, one of said layers within said chamber being said first portion of said belt filter media in contact with said slurry materials and adapted to remove solid materials from said slurry while liquid materials are passed through said first portion of said belt filter media, the other of said layers being said second portion of said belt filter media and being below said first portion layer, said second portion of said belt filter media being backwashed by said liquid materials passing through said first portion of said belt filter media layer.

11. The filter apparatus of claim 1 wherein said means for treating said belt filter medium includes means for passing said belt filter medium through a chemical bath prior to entry into said filter chamber.

12. The filter apparatus of claim 1 wherein said means for treating said belt filter medium includes means for passing said belt filter medium through a chemical bath with vibratory treatment after discharge of said filter cake from said belt filter medium.

13. The filter apparatus of claim 1 wherein said means for treating said belt filter medium includes a means for applying materials to said belt filter medium prior to entry into said filter chamber.

14. The filter apparatus of claim 1 wherein said belt treatment means includes means for vibrating said belt filter medium during the presence of said belt within said treatment means.

15. The filter apparatus of claim 14 wherein said vibrating means is an ultrasonic vibrating means.

16. The filter apparatus of claim 1 wherein said belt treatment means includes means for backwashing said belt, means for chemically treating said belt, and means for vibrating said belt treatment means, said backwashing, chemically treating and vibrating means being controlled by said sensing means to treat said filter belt medium outside of said filter chamber in preparation for positioning said belt filter medium within said filter chamber for repeated pressure filtering operations.

17. A method for treating a continuous belt filter medium mounted on a filter apparatus having a filter chamber, belt treating means outside of said filter chamber and means for moving said belt filter medium sequentially through said filter chamber and said belt treating means, comprising the steps of:

a) positioning a first portion of said belt filter medium within said filter chamber for a filtering operation adapted to separate a slurry having solids and liquids and for retaining said slurry solids on said belt filter medium, b) positioning said first portion of said belt filter medium within said belt treating means, c) cleaning said first portion of said belt filter medium in said treating means to remove said slurry solids from said belt, d) applying materials to said first portion of said belt filter medium in preparation for reentry of first portion of said belt filter medium into said filter chamber, e) and sequentially repeating the above steps a), b), c) and d) on sequential portions of said continuous belt filter medium.

18. The method of claim 17 wherein said applied materials are surfactant materials.

19. The method of claim 17 wherein said applied materials are hydrophilic materials.

20. The method of claim 17 wherein said applied materials are hydrophobic materials.

\* \* \* \* \*